United States Patent
López Olmo et al.

(10) Patent No.: US 11,717,004 B2
(45) Date of Patent: Aug. 8, 2023

(54) METHOD FOR OBTAINING ICE CREAM CONES AND PRODUCT THEREOF

(71) Applicant: KH Alacant Innova, S.L.U., Alicante (ES)

(72) Inventors: Elena López Olmo, Alicante (ES); Marta Araceli Leira Alonso, Alicante (ES); Juan Viñallonga Pla, Barcelona (ES)

(73) Assignee: KH Alacant Innova, S.L.U., Alicante (ES)

( * ) Notice: Subject to any disclaimer, the term of this patent is extended or adjusted under 35 U.S.C. 154(b) by 648 days.

(21) Appl. No.: 16/607,790

(22) PCT Filed: Apr. 20, 2018

(86) PCT No.: PCT/ES2018/070318
§ 371 (c)(1),
(2) Date: Oct. 24, 2019

(87) PCT Pub. No.: WO2018/197734
PCT Pub. Date: Nov. 1, 2018

(65) Prior Publication Data
US 2020/0178561 A1    Jun. 11, 2020

(30) Foreign Application Priority Data

Apr. 27, 2017   (ES) ................ ES201730640

(51) Int. Cl.
*A23G 9/28*    (2006.01)
*A21D 13/33*    (2017.01)
(Continued)

(52) U.S. Cl.
CPC ............ *A23G 9/288* (2013.01); *A21C 15/025* (2013.01); *A21D 13/24* (2017.01); *A21D 13/33* (2017.01);
(Continued)

(58) Field of Classification Search
CPC .......... A23G 9/283; A23G 9/288; A23G 9/48; A23G 9/506; A23P 20/15; A21D 13/33; A21D 13/36; B65D 3/06; B65D 85/78
(Continued)

(56) References Cited

U.S. PATENT DOCUMENTS 2,925,347 A    2/1960    Cummings et al.
3,171,367 A    3/1965    Carter et al.
(Continued)

FOREIGN PATENT DOCUMENTS

EP    0962151 A1    12/1999
EP    1005276 B1    1/2005
(Continued)

OTHER PUBLICATIONS

Marshall et al., "Ice Cream" Fifth edition, Aspen Publication, 2000, pp. 240, 256 (Year: 2000).*
(Continued)

*Primary Examiner* — Jyoti Chawla
(74) *Attorney, Agent, or Firm* — The Webb Law Firm

(57) ABSTRACT

The present disclosure relates to a method for preparing an ice cream cone, formed by a cone-shaped wafer and a layer of chocolate arranged on the inner face and upper edge of said wafer, with ice cream inside the ice cream cone. Another object of the invention is the ice cream cone obtained from said process.

18 Claims, 8 Drawing Sheets

(51) Int. Cl.
  *A21D 13/36* (2017.01)
  *A23P 20/15* (2016.01)
  *A21D 13/24* (2017.01)
  *A21C 15/02* (2006.01)
  *A23G 9/48* (2006.01)
  *A23G 9/50* (2006.01)
  *B65D 3/06* (2006.01)
  *B65D 85/78* (2006.01)

(52) U.S. Cl.
  CPC ............. *A21D 13/36* (2017.01); *A23G 9/283* (2013.01); *A23G 9/48* (2013.01); *A23G 9/506* (2013.01); *A23P 20/15* (2016.08); *B65D 3/06* (2013.01); *B65D 85/78* (2013.01)

(58) Field of Classification Search
  USPC .......................................................... 426/95
  See application file for complete search history.

(56) References Cited

U.S. PATENT DOCUMENTS

| | | | |
|---|---|---|---|
| 4,188,768 A | 2/1980 | Getman | |
| 4,396,633 A * | 8/1983 | Tresser | A23D 9/00 426/607 |
| 4,789,552 A * | 12/1988 | Speakman | A23G 9/245 426/282 |
| 5,102,672 A * | 4/1992 | Vos | A23G 7/02 426/94 |
| 5,463,878 A * | 11/1995 | Parekh | F25B 47/022 62/394 |
| 6,235,324 B1 | 5/2001 | Grigoli et al. | |
| 8,895,097 B2 | 11/2014 | Farina | |
| 2004/0180120 A1* | 9/2004 | Leas | A23G 9/24 426/139 |
| 2005/0202133 A1* | 9/2005 | Wolever | A23G 3/566 426/138 |
| 2006/0215485 A1* | 9/2006 | Rasmussen | A23G 9/04 366/144 |
| 2013/0251859 A1 | 9/2013 | Daouse et al. | |

FOREIGN PATENT DOCUMENTS

| | | |
|---|---|---|
| EP | 1719413 A1 | 11/2006 |
| JP | 1991210152 A | 9/1991 |
| WO | 03/000064 A1 | 1/2003 |
| WO | 2014/079846 A1 | 5/2014 |

OTHER PUBLICATIONS

Coronetto Icecreampark.com (dated Feb. 20, 2015 obtained from http://www.icecreampark.com/cornetto-ice-cream.htm), hereinafter Coronetto (Year: 2015).*

* cited by examiner

METHOD FOR OBTAINING ICE CREAM CONES AND PRODUCT THEREOF

CROSS-REFERENCE TO RELATED APPLICATIONS

This application is the United States national phase of International Application No. PCT/ES2018/070318 filed Apr. 20, 2018, and claims priority to Spanish Patent Application No. P201730640 filed Apr. 27, 2017, the disclosures of which are hereby incorporated by reference in their entirety.

BACKGROUND OF THE INVENTION

Field of the Invention

This disclosure relates to the field of the food industry, and more specifically to the production of ice cream cones.

Description of Related Art

In general terms, consumption habits of customers with respect to ice creams have led ice cream manufacturers to develop supply systems to obtain an appealing gastronomical product that is easy for the consumer to eat.

There are many different ways in which this food product can be presented, although the most traditional way is the well-known "ice cream cone", which is formed by a cone-shaped wafer in which the ice cream is arranged. This form of presentation of ice cream entails an enormous advantage for the consumer since it is very easy to consume and no utensils are required.

From this perspective, different systems have been generated in the food industry to be able to sell this product, already factory-prepared, both in a traditional ice cream parlor and in a convenience store or supermarket. Optionally, consumers can readily prepare their own ice cream cone to their own liking, acquiring said ice cream and the wafer separately.

In the case of a factory-prepared ice cream cone, the ice cream is homogeneously introduced at a given temperature into the wafer, and the resulting product is then arranged inside a wrapper for its subsequent sale. Nevertheless, this method of obtaining has an enormous drawback. The fact that the product is factory-prepared means that the ice cream and wafer are in contact for a given period of time, the wafer being affected by moisture and the flavour of the ice cream, gradually losing the organoleptic characteristics and texture of said wafer.

Therefore, the only way to assure that the consumer could eat an ice cream cone in which the wafer maintains all its organoleptic properties and texture was when the consumer acquired an ice cream cone in an ice cream parlor, or preparing their own ice cream cone, reducing the time of contact between the wafer and ice cream when in contact.

For the purpose of overcoming this problem of the loss of properties of the food product, the ice cream industry proposed as a solution separating the wafer from the ice cream by means of a layer of chocolate on the inner face of said wafer. On this basis, the process of producing an ice cream cone which is conventionally used comprises the following steps:
1. Including the wafer with the corresponding mould in the machine.
2. Incorporating 3 g of chocolate in the wafer to form the chocolate tip at the end of the wafer.
3. Spraying the wafer with 8 g of chocolate forming a whole covering on the wafer.
4. Drying the chocolate.
5. Including the ice cream with a rosette-like nozzle.
6. Decorating with chocolate the grooves left by the final formation of the ice cream with the nozzle.
7. Decorating with toppings such as almonds, pralines, hazelnuts, etc., through a vibration machine.

Nevertheless, this method presents a considerable problem, particularly in steps 3 and 5, given that since the chocolate is applied by means of spraying on the inner face of the wafer, the drying time is insufficient to ensure complete adhesion of the covering to the wafer. Since it is not completely dried, the inclusion of the ice cream pulls away some of the chocolate, causing contact of this ice cream with the wafer, which leads to subsequent softening of the wafer as it is subjected to the moisture from the ice cream, as this method does not allow for satisfactory isolation of said wafer.

Therefore, it can be verified that this working method does not solve the problem that is considered.

There are alternatives to these conventional methods in the patent literature, such as in patent application EP0962151 (A1), which describes placing the ice cream in a chocolate shell and then introducing it in the wafer. This process presents the drawback of having to separately prepare the wafer in the suitable mould, and independently introduce the ice cream into a cone-shaped chocolate shell in order to then introduce it into the wafer so that said ice cream previously combined with the chocolate does not affect the wafer. This process is tedious and longer, since it implies producing two sub-products and then joining them together to form the ice cream cone.

There are also other patents which describe apparatus and methods used in the ice cream industry for obtaining ice cream cones, such as U.S. Pat. No. 8,895,097B2 or EP1005276B1, but neither of these examples describes a method for obtaining an ice cream cone on an industrial level for its subsequent sale to the public which allows obtaining an end product, the wafer of which is completely separated from the ice cream to prevent the loss of the organoleptic properties of said wafer.

For this reason, the method object of this disclosure and the product thereof are presented as a solution to the problem herein considered and left unsolved by conventional methods and by the methods described above, giving rise to a completely surprising method since it allows homogeneously distributing the chocolate on the inner face of the wafer without producing unprotected areas, such that the wafer is satisfactorily isolated from the moisture of the ice cream.

As a result, an innovative method which offers a guaranteed reduction of the wafer softening problem is developed. Another common objective of this method is the development of a new product that is innovative and appealing to consumers.

SUMMARY OF THE INVENTION

The present disclosure relates to a method for obtaining an ice cream cone comprising a cone-shaped wafer (2), which is coated with chocolate on the inner face and upper edge of the wafer (2), and ice cream inside it.

Therefore an object of the present application is a method for obtaining an ice cream cone including the following steps:

placing a cone-shaped wafer (2) in a mould (1) adapted to the shape of the wafer, as can be observed in FIG. 1, injecting into the wafer (2) by means of a nozzle (4) 8 and 20 grams of chocolate (3) in liquid state at a temperature between 25° C. and 37° C., as can be observed in FIG. 2, and injecting between 15 and 40 grams of ice cream at a temperature between −4° C. and −8° C. by means of a nozzle (4) exerting a pressure between 2 and 6 bar.

An ice cream cone which is also object of this disclosure is thereby obtained, wherein the chocolate (3) is distributed homogeneously over the inner surface and upper edge of the wafer (2), isolating said wafer (2) from the ice cream (5).

Said ice cream cone comprises:
- a cone-shaped wafer (2) having a volume between 110 and 125 ml, and a height between 118 mm and 135 mm, and a distance from the tip of the wafer (2) to the decoration between 120 and 137 mm,
- a chocolate cream (3) having a viscosity of 200 cps to 350 cps at a temperature of 40° C. Said cream transitions to a solid state at temperatures less than 27° C., and the chocolate is homogeneously distributed over the inner surface of the wafer (2), the upper edge of the wafer (2) and up to a minimum height of 1 mm and a maximum height of 7 mm above the upper edge of the wafer (2).
- Ice cream (5) arranged inside the cone.

The advantage of this method and of the ice cream cone is that the wafer of said cone is crunchier and has all its organoleptic characteristics. Furthermore, another additional advantage is that if the wafer (2) is crunchy and has all its properties, it is much more consistent and has the capacity to withstand the ice cream (5) for a longer time while consuming the ice cream. It is therefore less likely that the wafer (2) will quickly soften, thereby preventing the ice cream (5) from breaking the wafer (2) and said ice cream (5) coming out of the cone, reducing the possibility staining.

BRIEF DESCRIPTION OF THE DRAWINGS

To complement the description that is being made and for the purpose of helping to better understand the features of this disclosure according to a preferred practical embodiment thereof, a set of figures is as an integral part of said description, wherein the following is depicted with an illustrative and non-limiting character.

Figure 1:
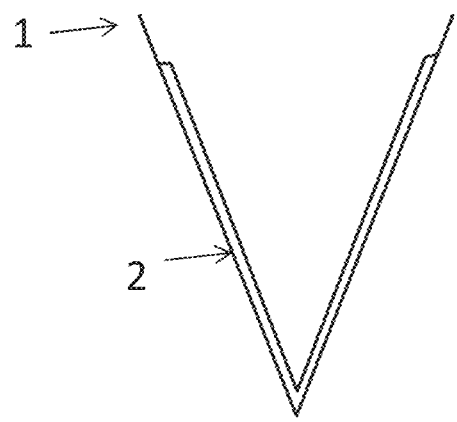
FIG. 1: Schematic diagram of the wafer (2) placed in the mould (1).

A list of reference signs represented in the figures making up this disclosure is provided below:
1. Mould
2. Wafer
3. Chocolate
4. Ice cream dosing nozzle
5. Ice cream
6. Ice cream crown
7. Food additive

DETAILED DESCRIPTION OF THE INVENTION

This disclosure relates to the method for obtaining an ice cream cone formed by a cone-shaped wafer (2) and a layer of chocolate (3) which is arranged on the inner face and upper edge of said wafer (2), and ice cream (3) inside it.

Figure 2:
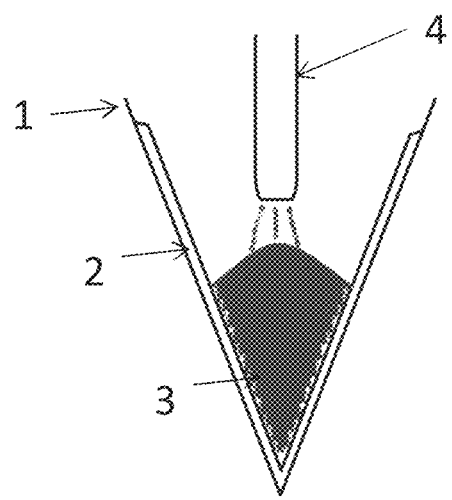
FIG. 2: Schematic diagram of the injection of the chocolate (3) into the wafer (2).

Therefore an object of the present application is a method for obtaining an ice cream cone including the following steps:

placing a cone-shaped wafer (2) in a mould (1) adapted to the shape of the wafer, as can be observed in FIG. 1, injecting into the wafer (2) by means of a nozzle (4) 8 and 20 grams of chocolate (3) in liquid state at a temperature between 25° C. and 37° C., as can be observed in FIG. 2, and injecting between 15 and 40 grams of ice cream at a temperature between −4° C. and −8° C. by means of a nozzle (4) exerting a pressure between 2 and 6 bar.

In a preferred embodiment, the amount of chocolate (3) which is injected into the wafer (2) can be from 10 to 20 grams, and in an even more preferred embodiment 18 grams of chocolate (3) can be added. Likewise, the chocolate (3) which is injected into the wafer (2) can preferably be at a temperature between 28 and 35° C., and in an even more preferred embodiment, the chocolate is at a temperature of 32° C.

In a preferred embodiment, in the step of injecting the ice cream (5), which in the context of the present application is also referred to as first ice cream station, the amount of ice cream (5) which is injected into the wafer (2) can be from 18 to 35 grams, and in a even more preferred embodiment 33 grams of ice cream (5) can be added. See FIGS. 3 and 4. Likewise, the ice cream which is injected into the wafer (2) can preferably be at a temperature between −4° C. and −6° C., and in an even more preferred embodiment, the ice cream is at a temperature of −5° C. This dosing of ice cream makes the chocolate (3) dosaged in the preceding step of the method move upwardly and expand over the inner area of the wafer (2), completely covering it and thereby preventing the moisture of the ice cream (5) from being transferred to the wafer (2). This layer raises up until it goes past the edge of the wafer (2) by a height between 1 and 7 mm. With this height excess, it is assured that there is no point that is not coated with the chocolate (3) through which the moisture of the ice cream (5) may affect the wafer (2). In the scope of the present disclosure, the distribution of the chocolate (3) must go beyond the edge of the wafer (2) by at least 1 mm, otherwise the moisture from the ice cream (2) may penetrate this area in the wafer (2), rendering a perfect coating in lower areas of the wafer (2) useless.

Figure 3:
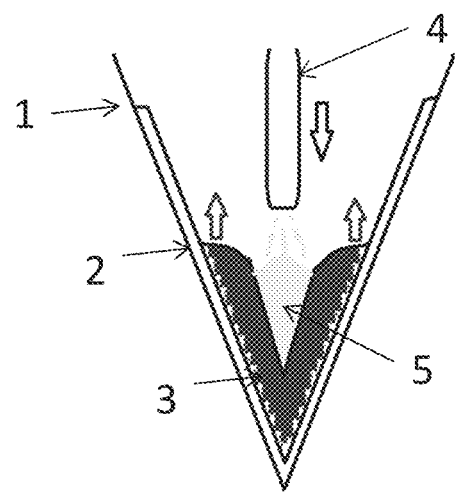
FIG. 3: Schematic diagram of the first ice cream station where the injection of the ice cream (5) into the wafer (2) can be observed, moving the chocolate (3) inside the wafer (2).
Figure 4:
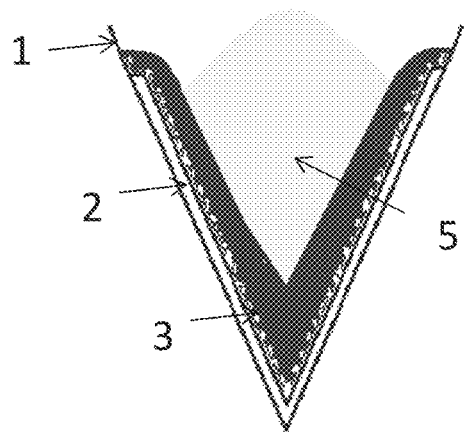
FIG. 4: Schematic diagram of the ice cream (5) placed on the chocolate (3), and the chocolate (3) coating the inner surface and the upper edge of the wafer (2). In this diagram, it can be seen how the chocolate (3) has been moved by the ice cream (5), homogeneously distributing said chocolate (3) over the inner surface and upper part of the wafer (2).

It should be pointed out that what makes this method for obtaining the ice cream cone truly surprising is that the chocolate (3) in liquid form is homogeneously distributed as a result of the ice cream (5) itself which is injected into the wafer (2) immediately after the step of injecting the chocolate (3), as can be observed in FIG. 3. This makes the method object of this disclosure simpler and faster, therefore reducing production costs.

The distribution of the chocolate (3) in the wafer (2) is homogeneous and covers the entire inner surface of the wafer (2) and the upper edge thereof, preventing the ice cream (5) from coming into contact with the wafer (2), thereby maintaining the organoleptic properties of said wafer (2).

In a preferred embodiment, the method object of this disclosure may include an additional step referred to as the second ice cream station, and it consists of injecting for a second time between 10 and 35 grams of ice cream (5) between −4° C. and −8° C., to enable forming an ice cream crown (6). The ice cream (2) injected in this second station is metered with a pressure between 1 and 6 bar.

In the context of the present application, ice cream crown (6) is understood to be the portion of ice cream (5) which is placed at the upper part of the ice cream cone, once the method object of this disclosure has ended. The amount of ice cream (5) placed on the ice cream cone is variable. In a preferred embodiment, the amount of ice cream (5) placed on the ice cream cone is 10 grams to 35 grams, and in an even more preferred embodiment, the amount of ice cream (5) placed is 28 grams. At this point it should be pointed out that depending on the amount of ice cream forming the ice cream crown (6), said crown can have a minimum height of 10 mm and a maximum height of 50 mm above the upper edge of the wafer (2).

This means that once the two stations of ice cream (5) have been carried out, i.e., the cone is filled and the ice cream crown (6) is arranged above the wafer (2).

In the scope of protection of the present disclosure, the ice cream (5) which is used in the method for obtaining the ice cream cone may comprise the following components:
Between 32% and 50% of a mix of solids,
Between 6 and 15% of fat, and
Water until completing 100% of the mixture.

This composition of the ice cream may optionally comprise sweeteners and colourings.

In the context of the present application, the mix of solids is defined as a mixture of ingredients which are responsible for the flavour of the ice cream, the nature of which is solid and must be ground to subsequently be mixed with a type of fat and water. On this basis, the solids can be fruits, dried fruits and nuts, cakes, biscuits, coffee beans, to mention a few. The different solids used in making ice cream may widely vary, there being as many as there are flavours of ice cream on the market.

Additionally, animal or vegetable fats are added to a composition of ice cream in order to provide the ice cream with texture in both solid and liquid state, allowing the ice cream to be subjected to temperatures characteristic of making ice cream, which allows maintaining its consistency over long periods of freezing time.

Said ice cream furthermore has a density between 1 and 1.3% Kg/liter, at a temperature of between 22° C. and 25° C.

Optionally the method object of this disclosure may also comprise an additional step in which at least one food additive (7) is added for the purpose of decorating and improving the flavour of the end product. This step is carried out in a preferred embodiment of the method object of this disclosure and is independent of the additional step referred to as second ice cream station. Said food additive (7) is arranged in the upper part of the ice cream (5) or on top of the ice cream crown (6), in the event that the ice cream has a crown (6). Said food additive (7) is selected from the group consisting of dried fruits and nuts, pralines, cereals, syrups, chocolates and chocolate substitutes.

In a preferred embodiment of the method object of this disclosure, the ice cream (5) which is used in the method object of this disclosure may also comprise a food additive (7), for the purpose of providing an added value to the flavour of the ice cream. Said additive (7) can be included and distributed homogeneously in the ice cream or in longitudinal pencil form within the ice cream (5) which in turn is inside the wafer (2), said additive being chocolate, chocolate substitute or syrups.

Another fact that should be pointed out about this method is that both ice cream stations are successive and there is no standby step, which allows for a homogeneous distribution of said ice cream (5). The second ice cream station is the responsible for forming the crown of the ice cream cone (6), distributing the ice cream (5) from the upper edge of the cone from a minimum height of 10 mm and up to a maximum height of 50 mm. This step of the method for obtaining provides an added value to the obtained ice cream cone, because based on the texture and flavour of the wafer (2) or the flavour of the ice cream (5), the appearance of a food product makes it more accepted and appetizing for consumers.

The method object of this disclosure may also comprise an additional step whereby a paper wrapper is placed in the mould (1) before placing the wafer (2) on said mould (1). Therefore, once the process of obtaining an ice cream cone as described herein has ended, a new wrapper is placed in the form of a lid which fits with the upper part of the first wrapper and contains the ice cream cone for its subsequent freezing, and thus protecting it from possible impacts or friction during product storage and transport.

Nevertheless, it should be pointed out that this step of packaging which comprises placing the wrapper and the lid on the ice cream cone successively can also be performed at the end of the method for obtaining the ice cream cone.

Likewise, the step of freezing the product obtained by said method is understood as an additional step of the method object of this disclosure. In this step, the obtained ice cream cone is subjected to a temperature of between −20° C. to −30° C., and in a preferred embodiment at −28° C., for a period of 1 to 3 months. Once this step has ended, the obtained end product is distributed to points of sale without breaking the cold chain.

The ice cream cone obtained by the method object of this disclosure described above is also object of the present disclosure. Said ice cream cone comprises chocolate (3) which is distributed homogeneously over the inner surface and upper edge of the wafer (2), isolating said wafer (2) from the ice cream (5). Said ice cream cone comprises:
- a cone-shaped wafer (2) having a volume between 110 and 125 ml, and a height between 118 mm and 135 mm, and a distance from the tip of the wafer (2) to the decoration between 120 and 137 mm,
- a milk chocolate cream (3) having a viscosity of 200 cps to 350 cps at a temperature of 40° C. Said cream is in solid state at temperatures less than 27° C., and is distributed over the inner surface and upper edge of the wafer (2) and up to a minimum height of 1 mm and a maximum height of 7 mm above the upper edge of the wafer (2).
- Ice cream (5) arranged inside the cone.

In the context of the present application the wafer (2) of the ice cream cone can be of the following type:
- Standard cone: Cone-shaped rolled wafer with a volume of 120 ml
- Standard cone
- Standard cone with chocolate
- Standard cone without sugar
- Mini cone: Cone-shaped rolled wafer with volumes less than 120 ml
- Danish cone: Cone-shaped rolled wafer of different dimensions similar to hand-made wafers
- Moulded cone: Cones made in different moulds. Dough is introduced in a specific mould and cones of different shapes and dimensions are formed.

In a preferred embodiment, the ice cream (5) can be distributed above the upper edge of the wafer (2) at a distance of between 10 to 50 mm. This portion of ice cream (5) above the upper edge of the wafer (2) is referred to as ice cream crown.

Furthermore, in a preferred embodiment, the ice cream object of this disclosure may comprise at least one food additive (7), for the purpose of providing an added value to the appearance and flavour of the ice cream cone. Said food additive (7) is arranged in the upper part of the ice cream (5) or on top of the ice cream crown (6), in the event that the ice cream has a crown. Said food additive (7) is selected from the group consisting of dried fruits and nuts, pralines, cereals, syrups, chocolates and chocolate substitutes.

In a preferred embodiment, the ice cream object of this disclosure may also comprise a food additive (7), for the purpose of providing an added value to the flavour of the ice cream (5). Said additive (7) can be included and distributed homogeneously in the ice cream or in longitudinal pencil form within the ice cream (5) which in turn is inside the wafer (2), said additive being chocolate, chocolate substitute or syrups.

Embodiments of the Invention

For the purpose of helping to better understand this disclosure, and according to a practical embodiment thereof, an exemplary preferred embodiment is enclosed as an integral part of description, being illustrative and never limiting of this disclosure.

Experiment

A series of ice cream cones were prepared to check the homogeneous distribution of the chocolate (3) on the inner surface and upper edge of the wafer (2), and to enable checking that said wafer (2) maintains its organoleptic properties. To that end, the following steps for preparing an ice cream cone were carried out:
- A cone-shaped wafer (2) was placed in a mould (1) adapted to the shape of the wafer,
- 18 grams of chocolate (3) at a temperature of 32° C. were injected by means of a nozzle (4) into the wafer (2).
- between 33 grams of ice cream (5) at a temperature of −5° C. were injected by means of a nozzle (4) exerting a pressure of 5 bar.

Figure 7:
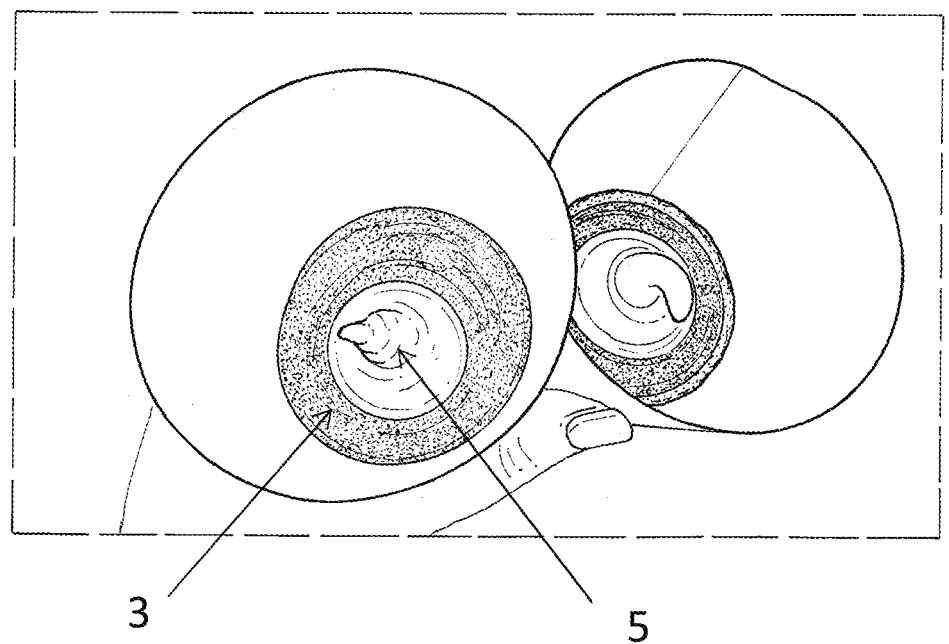
FIG. 7: Photograph taken from the top of the ice cream cone obtained in the method for obtaining the product as described in Example 1.

These steps were performed as described in the schematic diagram in FIGS. 1 to 4. Additionally see FIG. 7, which shows the result of the method described in the present example.

Figure 5:
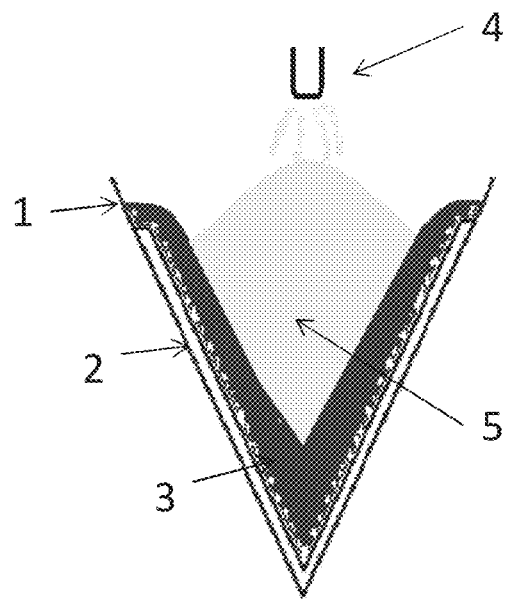
FIG. 5: Schematic diagram of the second ice cream station where the injection of the ice cream on the upper part of the ice cream cone can be observed, forming the ice cream crown (6).
Figure 6:
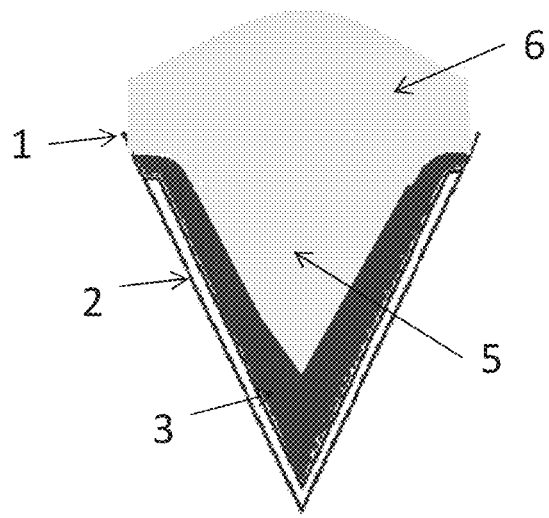
FIG. 6: Schematic diagram of the ice cream cone with the ice cream crown (6).

Then a second injection of ice cream (5) was performed on the upper part of the cone to form an ice cream crown (6), as can be observed in FIGS. 5 and 6.

Finally, a layer of chocolate ganache and chocolate chips was added as a food additive (7).

To check the distribution of the chocolate (3) inside the wafer (2) at the end of the process of obtaining the ice cream cone, two different groups of ice creams were analysed.
- A first group of ice creams in which the ice cream crown (6) and the ice cream (5) contained in the cone were removed.
- A second group of ice creams in which the ice cream (5) was not removed.

Results

Figure 8:
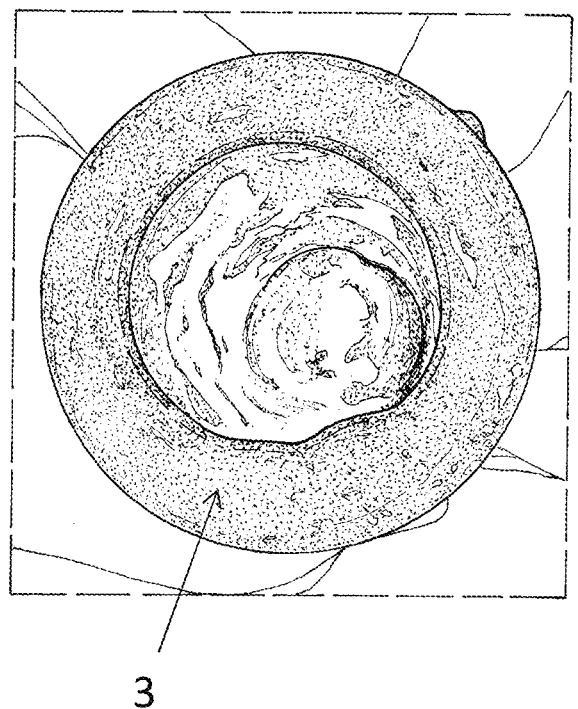
FIG. 8: Photograph taken from the top of the ice cream cone obtained in the method for obtaining the product as described in Example 1, once the ice cream (5) has been extracted. The homogeneous distribution of the chocolate (3) at the upper edge of the wafer (2) can be observed in said photograph.
Figure 9:
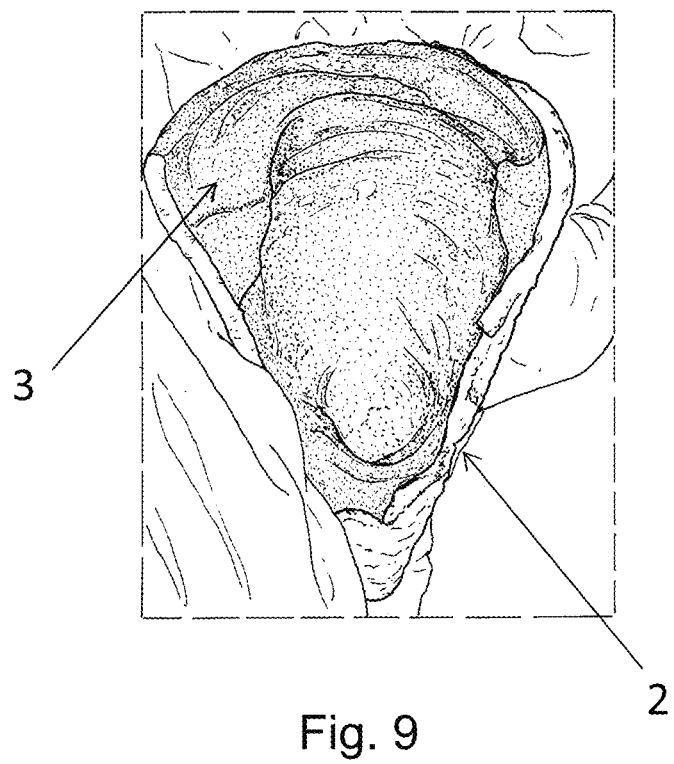
FIG. 9: Photograph taken from the top of a longitudinal section of the ice cream cone obtained in the method for obtaining the product as described in Example 1, once the ice cream (5) has been extracted. The homogeneous distribution of the chocolate (3) over the inner surface of the wafer (2) can be observed in said photograph.
Figure 10:
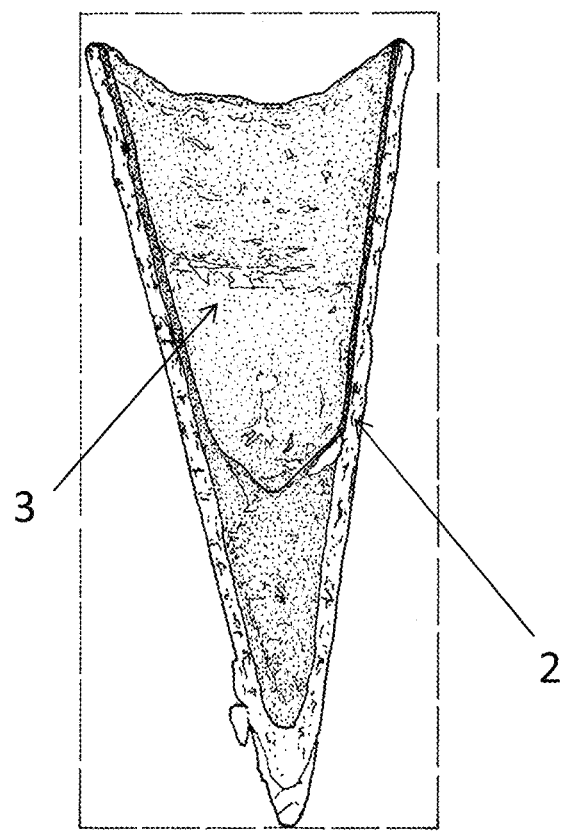
FIG. 10: Photograph of a longitudinal section of the ice cream cone obtained in the method for obtaining the product as described in Example 1, once the ice cream (5) has been extracted. The homogeneous distribution of the chocolate (3) over the inner surface and upper edge of the wafer (2) can be observed in said photograph.

See FIGS. 8 to 10 corresponding to ice creams from the first group, where it can be observed that the chocolate (3) has been homogeneously distributed over the entire inner face and upper edge of the wafer (2) of the ice cream cone.

Figure 11:
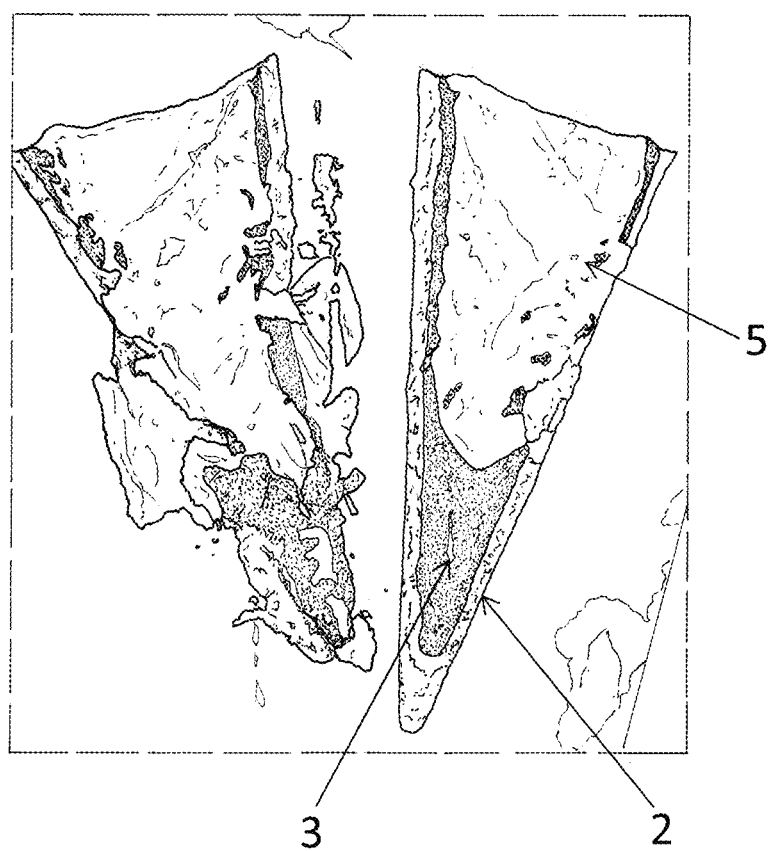
FIG. 11: Photograph of a longitudinal section of the ice cream cone obtained in the method for obtaining the product as described in Example 1 without removing the ice cream (5). The homogeneous distribution of the chocolate (3) over the inner surface and upper edge of the wafer (2) can be observed in said photograph.
Figure 12:
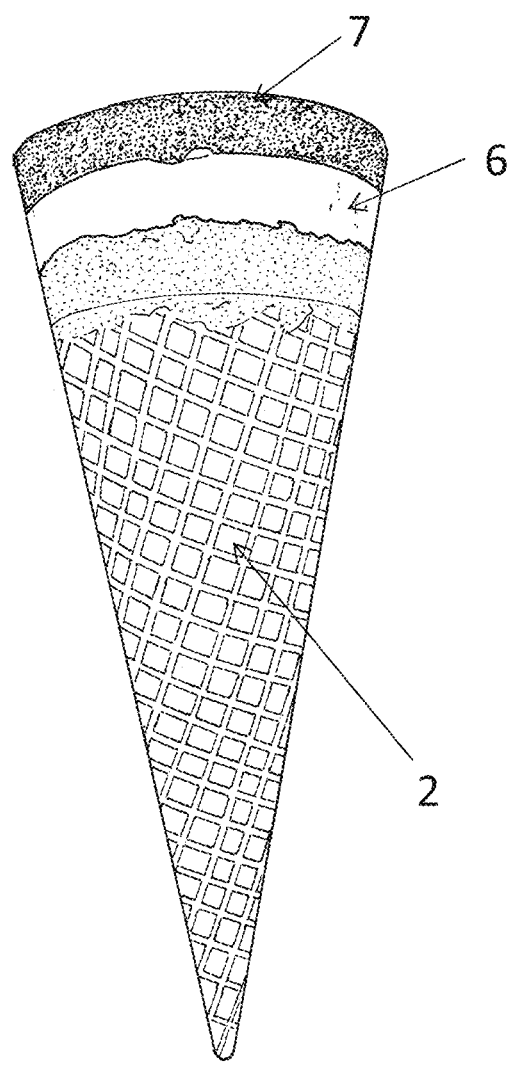
FIG. 12: Photograph of the outer surface of the wafer (2) of the ice cream cone obtained in the method for obtaining the product as described in Example 1. It can be observed in said photograph that the wafer (2) of the ice cream cone has not sustained any alteration due to the ice cream (5).
Figure 13:
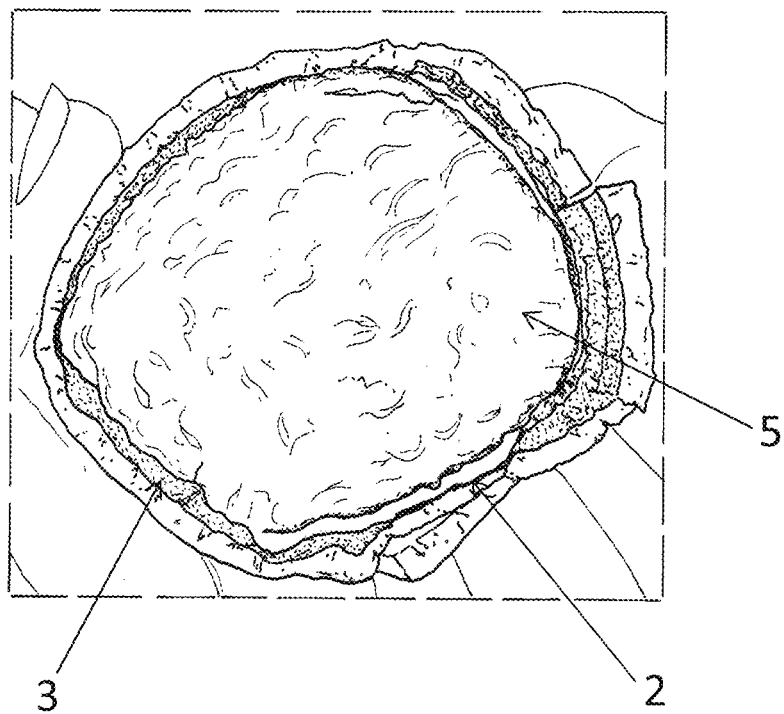
FIG. 13: Photograph taken from the top of a cross section of the ice cream cone obtained in the method for obtaining the product as described in Example 1. It can be observed in said photograph that the wafer (2) of the ice cream cone has not sustained any alteration due to the ice cream (5), and the homogeneous distribution of the chocolate (3) which prevents the wafer (2) and ice cream (5) from coming into contact with one another can also be observed.

See FIGS. 11 to 13 corresponding to ice creams of the second group, where it can be observed that the chocolate (3) has been homogeneously distributed over the entire inner face and upper edge of the wafer (2) of the ice cream cone.

CONCLUSION

Based on the obtained results, it could be verified that the method for obtaining the ice cream cone described herein allows for suitably distributing the chocolate (3) on the inner face and upper edge of the wafer (2), due to the step of injecting the ice cream, which has surprisingly distributed the chocolate (3) in a satisfactory manner over the entire inner surface of the wafer (2) and upper edge, giving rise to an ice cream cone, the wafer (2) of which retains all its organoleptic characteristics, being a product that is more appealing to and appreciated by the end consumer.

The invention claimed is:

1. A method for obtaining an ice cream cone, comprising:
   placing a cone-shaped wafer in a mold adapted to the shape of the wafer,
   injecting through a nozzle into the cone end of the wafer between 8 and 20 grams of chocolate in liquid form at a temperature between 25° C. and 37° C.,
   injecting between 15 and 40 grams of ice cream at a temperature between −4° C. and −8° C. with a nozzle exerting pressure between 2 and 6 bar, making the chocolate dosaged in the preceding step move upwardly and expand over the inner area of the wafer, giving rise to an ice cream cone in which the chocolate is distributed homogeneously over the inner surface and upper edge of the wafer, isolating said wafer from the ice cream.

2. The method according to claim 1, further comprising injecting between 10 and 35 grams of ice cream at a temperature between −4° C. and −8° C., in the upper part of the ice cream cone, forming an ice cream crown that reaches a minimum height of 10 mm up to a maximum height of 50 mm with respect to the upper edge of the ice cream cone.

3. The method according to claim 2, further comprising adding at least one food additive in the upper part of the ice cream cone.

4. The method according to claim 2, further comprising subjecting the ice cream cone to temperatures between −20° C. and −30° C. for a period of 1 to 3 months.

5. The method according to claim 2, further comprising placing a paper wrapper in the mold before placing the wafer in the mold.

6. The method according to claim 5, further comprising placing a lid on the ice cream cone which fits with the upper edge of the paper wrapper.

7. The method according to claim 1, further comprising adding at least one food additive in the upper part of the ice cream cone.

8. The method according to claim 7, wherein the food additive is selected from the group consisting of dried fruits and nuts, pralines, cereals, syrups and chocolates, or chocolate substitutes.

9. The method according to claim 1, wherein the ice cream includes a homogeneously distributed food additive.

10. The method according to claim 1, further comprising subjecting the ice cream cone to temperatures between −20° C. and −30° C. for a period of 1 to 3 months.

11. The method according to claim 1, further comprising placing a paper wrapper in the mold before placing the wafer in the mold.

12. The method according to claim 11, further comprising placing a lid on the ice cream cone which fits with the upper edge of the paper wrapper.

13. An ice cream cone obtained by the method described in claim 1, wherein the chocolate is distributed homogeneously over the inner surface and upper edge of the wafer, isolating said wafer from the ice cream.

14. The ice cream cone according to claim 13, further comprising:
   a cone-shaped wafer,
   15 to 40 grams of ice cream the density of which is between 430 g/l and 800 g/l at a temperature of 25° C., and
   8 to 20 grams of chocolate cream at a temperature of 40° C., homogeneously distributed over the entire inner surface and upper edge of the wafer such that the chocolate cream is at a minimum of 1 mm and up to a maximum of 7 mm above the upper edge of the wafer.

15. The ice cream cone according to claim 14, further comprising an ice cream crown, wherein said ice cream crown reaches a minimum height of 10 mm up to a maximum height of 50 mm with respect to the upper edge of the wafer.

16. The ice cream cone according to claim 13, further comprising an ice cream crown, wherein said ice cream crown reaches a minimum height of 10 mm up to a maximum height of 50 mm with respect to the upper edge of the wafer.

17. The ice cream cone according to claim 13, further comprising a food additive in the upper part of the ice cream cone.

18. The ice cream cone according to claim 13, further comprising a food additive which is homogeneously included in the ice cream.

* * * * *